(12) United States Patent
Douceur et al.

(10) Patent No.: US 8,335,991 B2
(45) Date of Patent: Dec. 18, 2012

(54) SECURE APPLICATION INTEROPERATION VIA USER INTERFACE GESTURES

(75) Inventors: John R. Douceur, Bellevue, WA (US); Jonathan R. Howell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 12/814,154

(22) Filed: Jun. 11, 2010

(65) Prior Publication Data

US 2011/0307817 A1    Dec. 15, 2011

(51) Int. Cl.
*G06F 3/048* (2006.01)
*G06F 3/00* (2006.01)

(52) U.S. Cl. ........ 715/769; 715/702; 715/770; 715/863; 715/864

(58) Field of Classification Search .............. 715/769, 715/702, 770, 863, 864
See application file for complete search history.

(56) References Cited

U.S. PATENT DOCUMENTS

| | | | | |
|---|---|---|---|---|
| 5,598,524 A * | 1/1997 | Johnston et al. | | 715/769 |
| 5,805,167 A * | 9/1998 | van Cruyningen | | 715/808 |
| 5,809,240 A * | 9/1998 | Kumagai | | 709/205 |
| 5,867,156 A * | 2/1999 | Beard et al. | | 715/753 |
| 5,923,307 A * | 7/1999 | Hogle, IV | | 345/4 |
| 6,271,839 B1 * | 8/2001 | Mairs et al. | | 715/807 |
| 6,459,442 B1 * | 10/2002 | Edwards et al. | | 715/863 |
| 6,476,834 B1 * | 11/2002 | Doval et al. | | 715/863 |
| 6,545,669 B1 * | 4/2003 | Kinawi et al. | | 345/173 |
| 6,590,568 B1 * | 7/2003 | Astala et al. | | 345/173 |
| 7,185,285 B2 * | 2/2007 | Van Dok et al. | | 715/753 |
| 7,289,110 B2 * | 10/2007 | Hansson | | 345/173 |
| 7,392,387 B2 * | 6/2008 | Balfanz et al. | | 713/168 |
| 7,426,403 B2 * | 9/2008 | Sundararajan et al. | | 455/566 |
| 7,532,196 B2 * | 5/2009 | Hinckley | | 345/156 |
| 7,533,189 B2 * | 5/2009 | Mahajan et al. | | 709/248 |
| 7,557,774 B2 * | 7/2009 | Baudisch et al. | | 345/1.1 |
| 7,565,414 B1 | 7/2009 | Love | | |
| 7,577,836 B2 * | 8/2009 | Puranik et al. | | 713/162 |
| 7,581,096 B2 * | 8/2009 | Balfanz et al. | | 713/168 |
| 7,636,794 B2 * | 12/2009 | Ramos et al. | | 709/248 |
| 7,696,985 B2 * | 4/2010 | Machida | | 345/169 |
| 7,724,242 B2 * | 5/2010 | Hillis et al. | | 345/173 |
| 7,750,911 B2 * | 7/2010 | Bae | | 345/442 |
| 7,802,195 B2 * | 9/2010 | Saul et al. | | 715/769 |
| 7,814,433 B2 * | 10/2010 | Johanson et al. | | 715/810 |
| 7,865,573 B2 * | 1/2011 | Tyhurst et al. | | 709/218 |
| 7,877,707 B2 * | 1/2011 | Westerman et al. | | 715/863 |

(Continued)

OTHER PUBLICATIONS

Baker, Cruz, Liotta, Tamassia, "The Mocha Algorithm Animation System", retrieved on Apr. 7, 2010 at <<http://citeseerx.ist.psu.edu/viewdoc/download?doi=10.1.1.49.2501&rep=rep1&type=pdf>>, ACM, Proceedings of Workshop on Advanced Visual Iinterfaces (AVI), 1996, pp. 248-250.

(Continued)

*Primary Examiner* — Steven B Theriault
(74) *Attorney, Agent, or Firm* — Lee & Hayes, PLLC

(57) ABSTRACT

Techniques for facilitating secure application interoperation via user interface (UI) gestures in computing devices that strictly isolate applications operating thereon are described herein. For instance, applications may define one or more specific UI gestures that, when executed by the user, express that the user desires for the computing device to allow for an instance of directed, ephemeral, by-value communication between two isolated applications. In some implementations, the gesture is an atomic gesture, such as a drag-and-drop operation. That is, the gesture is one that the user completes continuously and without interruption.

20 Claims, 8 Drawing Sheets

U.S. PATENT DOCUMENTS

| | | | | |
|---|---|---|---|---|
| 7,880,728 B2* | 2/2011 | de los Reyes et al. | | 345/173 |
| 7,884,805 B2* | 2/2011 | Thorn | | 345/173 |
| 7,908,482 B2* | 3/2011 | Lauter et al. | | 713/171 |
| 7,917,584 B2* | 3/2011 | Arthursson | | 709/205 |
| 7,926,095 B1* | 4/2011 | Weiner et al. | | 726/7 |
| 7,966,576 B2* | 6/2011 | Dongelmans | | 715/822 |
| 7,991,896 B2* | 8/2011 | Shen et al. | | 709/227 |
| 8,005,927 B2* | 8/2011 | Apfel et al. | | 709/219 |
| 8,059,111 B2* | 11/2011 | Harrison | | 345/204 |
| 8,068,609 B2* | 11/2011 | Puranik et al. | | 380/270 |
| 8,077,157 B2* | 12/2011 | Sengupta et al. | | 345/173 |
| 8,161,106 B2* | 4/2012 | Quinn et al. | | 709/204 |
| 8,190,895 B2* | 5/2012 | Lauter et al. | | 713/171 |
| 2002/0116205 A1* | 8/2002 | Ankireddipally et al. | | 705/1 |
| 2002/0169957 A1 | 11/2002 | Hale et al. | | |
| 2004/0054899 A1* | 3/2004 | Balfanz et al. | | 713/168 |
| 2004/0179545 A1* | 9/2004 | Erola et al. | | 370/449 |
| 2005/0093868 A1* | 5/2005 | Hinckley | | 345/502 |
| 2005/0102376 A1* | 5/2005 | Ichikawa | | 709/219 |
| 2005/0165795 A1* | 7/2005 | Myka et al. | | 707/100 |
| 2005/0192052 A1* | 9/2005 | Tenhunen | | 455/557 |
| 2006/0070007 A1* | 3/2006 | Cummins et al. | | 715/769 |
| 2006/0225137 A1* | 10/2006 | Odins-Lucas et al. | | 726/27 |
| 2006/0256074 A1* | 11/2006 | Krum et al. | | 345/156 |
| 2006/0282817 A1 | 12/2006 | Darst et al. | | |
| 2007/0066323 A1* | 3/2007 | Park et al. | | 455/456.2 |
| 2007/0113194 A1 | 5/2007 | Bales et al. | | |
| 2007/0124503 A1* | 5/2007 | Ramos et al. | | 709/248 |
| 2007/0146347 A1* | 6/2007 | Rosenberg | | 345/173 |
| 2007/0191028 A1* | 8/2007 | Hinckley et al. | | 455/456.3 |
| 2007/0204149 A1* | 8/2007 | Balfanz et al. | | 713/156 |
| 2007/0249288 A1* | 10/2007 | Moallemi et al. | | 455/68 |
| 2007/0264976 A1* | 11/2007 | Lessing et al. | | 455/414.1 |
| 2007/0288599 A1* | 12/2007 | Saul et al. | | 709/218 |
| 2007/0296696 A1* | 12/2007 | Nurmi | | 345/158 |
| 2008/0028442 A1* | 1/2008 | Kaza et al. | | 726/4 |
| 2008/0039212 A1* | 2/2008 | Ahlgren et al. | | 463/46 |
| 2008/0040255 A1 | 2/2008 | Shapiro et al. | | |
| 2008/0134071 A1 | 6/2008 | Keohane et al. | | |
| 2008/0143685 A1* | 6/2008 | Lee et al. | | 345/173 |
| 2008/0250328 A1 | 10/2008 | Konttinen | | 715/747 |
| 2008/0259042 A1* | 10/2008 | Thorn | | 345/173 |
| 2009/0013310 A1 | 1/2009 | Arner et al. | | |
| 2009/0017799 A1* | 1/2009 | Thorn | | 455/414.1 |
| 2009/0140986 A1* | 6/2009 | Karkkainen et al. | | 345/173 |
| 2009/0210811 A1* | 8/2009 | Saul et al. | | 715/769 |
| 2009/0244015 A1* | 10/2009 | Sengupta et al. | | 345/173 |
| 2009/0259959 A1* | 10/2009 | Grotjohn et al. | | 715/769 |
| 2010/0013762 A1* | 1/2010 | Zontrop et al. | | 345/156 |
| 2010/0082990 A1* | 4/2010 | Grigorovitch | | 713/176 |
| 2010/0125806 A1* | 5/2010 | Igeta | | 715/770 |
| 2010/0175011 A1* | 7/2010 | Song et al. | | 715/769 |
| 2010/0295795 A1* | 11/2010 | Wilairat | | 345/173 |
| 2011/0081923 A1* | 4/2011 | Forutanpour et al. | | 455/457 |
| 2011/0083111 A1* | 4/2011 | Forutanpour et al. | | 715/863 |
| 2011/0099497 A1* | 4/2011 | Fok et al. | | 715/769 |
| 2011/0126009 A1* | 5/2011 | Camp et al. | | 713/168 |
| 2011/0126014 A1* | 5/2011 | Camp et al. | | 713/171 |
| 2011/0175822 A1* | 7/2011 | Poon et al. | | 345/173 |
| 2011/0249075 A1* | 10/2011 | Abuan et al. | | 348/14.02 |
| 2011/0249078 A1* | 10/2011 | Abuan et al. | | 348/14.02 |
| 2011/0275358 A1* | 11/2011 | Faenger | | 455/420 |
| 2012/0190386 A1* | 7/2012 | Anderson | | 455/456.3 |

OTHER PUBLICATIONS

Bussard, Roudier, "Embedding Distance-Bounding Protocols within Intuitive Interactions", retrieved on Apr. 7, 2010 at <<http://citeseerx.ist.psu.edu/viewdoc/download?doi=10.1.1.68.9994&rep=rep1&type=pdf>>, Springer Berlin, Security in Pervasive Computing, vol. 2802, 2004, pp. 119-142.

Lavana, Khetawat, Brglez, "Internet-based Workflows: A Paradigm for Dynamically Reconfigurable Desktop Environments", retrieved on Apr. 7, 2010 at <<http://citeseerx.ist.psu.edu/viewdoc/download?doi=10.1.1.50.7086&rep=rep1&type=pdf>>, ACM, Proceedings of Conference on Supporting Group Work: the integration challenge, Nov. 16, 1997, pp. 204-213.

Saul, Hutchison, "A Generic Graphical Specification Environment for Security Protocol Modelling", retrieved on Apr. 7, 2010 at <<http://citeseerx.ist.psu.edu/viewdoc/download?doi=10.1.1.19.6558&rep=rep1&type=pdf>>, Kluwer B.V., Proceedings of Conference on Information Security for Global Information Infrastructures (IFIP TC11), vol. 175, 2000, pp. 311-320.

* cited by examiner

SECURE APPLICATION INTEROPERATION VIA USER INTERFACE GESTURES

BACKGROUND

In certain environments, a user of a computing device accesses two or more multiply-distrusting applications. For instance, the user may access multiple applications running on an operating system that implements secure application isolation, multiple applications from different web sites separated by isolation mechanisms implemented by a web browser, multiple applications contained in virtual machines, and the like. In these instances, the applications and their data are strictly isolated from one another to increase the difficulty for one application to violate the privacy or confidentiality of the data in another application. This contrasts with weakly- or non-isolated multiple-application environments, such as traditional operating-system environments. Here, each application, by default, has access to most data of the user and, therefore, operates on a trust assumption that the application will only access or manipulate data when a user requests the application to do so. This assumption places great trust in developers of applications that operate within the traditional operating-system environment.

Meanwhile, when operating in an environment that isolates applications from one another, the user may desire to allow specific, controlled interactions between the isolated applications. Many such mechanisms are possible. For example, the user could establish a shared document store to which both applications have access, saving data into the store from the first application and opening it in the second. However, such techniques may prove burdensome to the user. For instance, this interaction involves effort to behalf of the user to set up and use the shared document store, making a simple interaction tedious relative to the default sharing policy of the conventional desktop paradigm. Further, these techniques introduce subtle security concerns. For instance, if an interaction channel, such as the shared folder, persists for a length of time, future data may leak unintentionally through this folder. For example, the user may save accidentally a more private file into the shared folder, leaking this file to the second application and, thus, violating confidentiality. Or, a malicious application with persistent access to the folder may subtly modify or alter a file at an arbitrary point in the future, compromising the integrity of the file.

Another mechanism to allow for interactions between otherwise isolated applications is to query the user each time an application attempts to communicate with another application. For instance, the techniques may present the user with a pop-up dialog box that asks the user to confirm that the user wishes to allow the requested communication. However, this places a burden on the user, and can sufficiently numb the user such that the user becomes habituated to clicking through such confirmation queries without thinking sufficiently about the implication of such selections. Such a scenario compromises security within the otherwise secure application-isolation environment.

SUMMARY

Techniques for facilitating secure application interoperation via user interface (UI) gestures are described herein. These techniques include detecting an atomic (e.g., continuous and uninterrupted) user gesture requesting to facilitate a communication between a first location of a computing device and a second location of the computing device. This computing device may provide a bilateral security boundary that otherwise isolates communications between the first and second locations. In response to detecting the gesture, the techniques may pierce the bilateral security boundary and may facilitate the requested communication between the first location and the second location. In one example, the user may use the gesture to request share data from a first application with a second application. In response, the techniques may pierce the security boundary between these applications and may share the data from the first application with the second application. This sharing may be directed (e.g., from the first application to the second application), ephemeral (e.g., free of granting any future permission to access the data), and by-value.

This summary is provided to introduce concepts relating to user interfaces. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
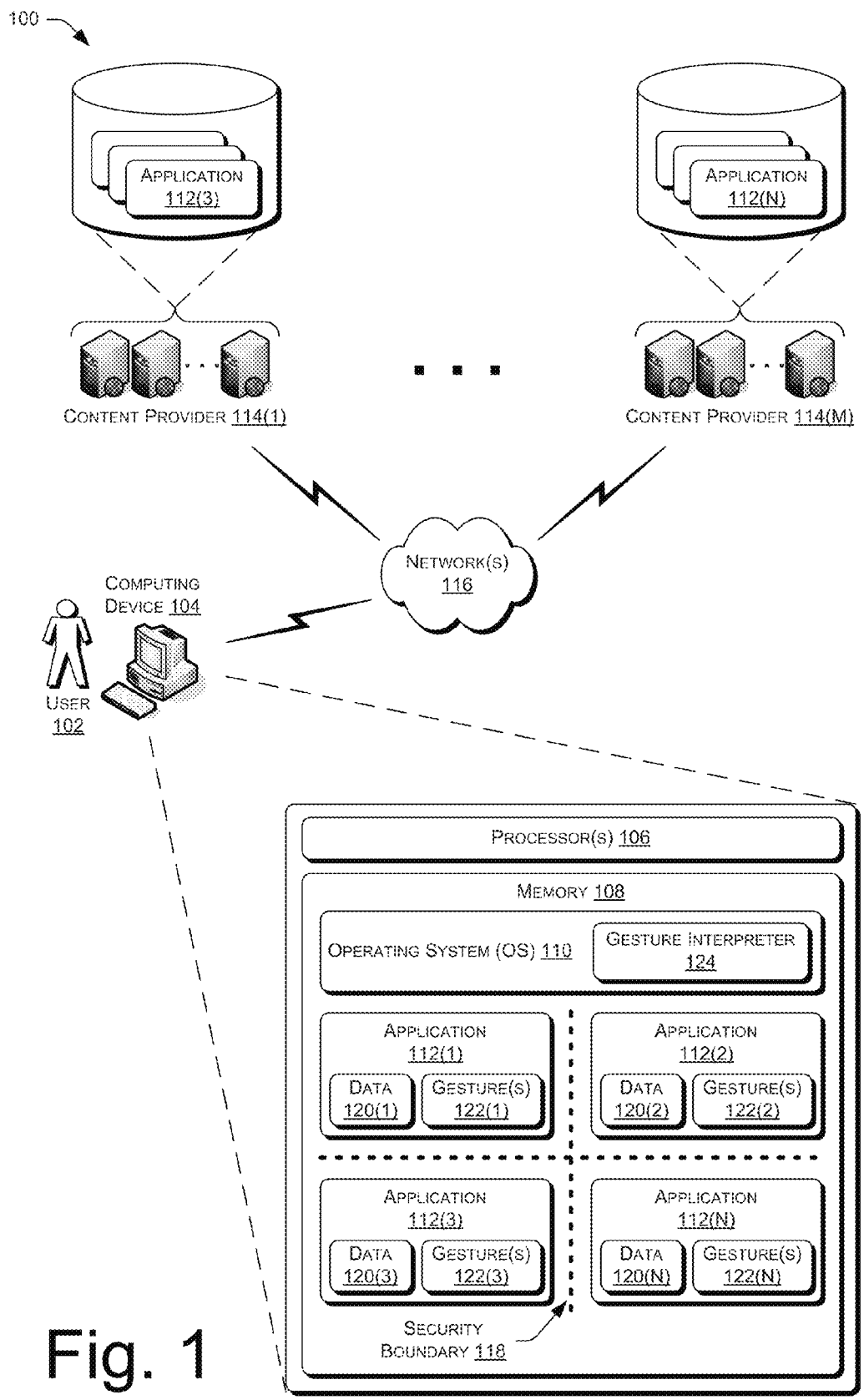
FIG. 1 illustrates an example computing architecture including a client computing device that provides a security boundary between each desktop or web application operating thereon. Within this architecture, the user may intuitively pierce the security boundary in a directed, ephemeral, and by-value manner via application-defined atomic gestures.

The disclosure describes techniques for facilitating secure application interoperation via user interface (UI) gestures in computing devices that strictly isolate applications operating thereon. For instance, applications may define one or more specific UI gestures that, when executed by the user, express that the user desires for the computing device to allow for an instance of directed, ephemeral, by-value communication between two otherwise isolated applications. In some implementations, the gesture is an atomic gesture. That is, the gesture is one that the user completes continuously and without interruption.

In one specific example of many, the gesture comprises a drag-and-drop operation. In response to detecting this gesture, the monitor (e.g., an operating system (OS), a web browser, a virtual machine monitor, etc.) reacts by requesting a constant object from the dragged-from application and delivering the constant object to the dropped-on application. Because the intent of the user is readily apparent from the standard semantics of the drag-and-drop operation, the monitor may safely infer that the user desired this particular instance of communication. As such, the monitor does not request explicit confirmation or permission (e.g., via a pop-up dialog box) for the action from the user.

These gestures, such as the drag-and-drop gesture, facilitate interactions among mutually-distrusting applications in the computing device. In the example of drag-and-drop, drag gestures are interpreted by the source application to mean that the user desires to copy out an object from the application by-value and ephemerally. This property helps preserve confidentiality by increasing the difficulty for potentially sensitive data to escape an isolation context of the application without the express intention of the user.

Drop gestures, meanwhile, may be interpreted by the destination application to mean that the user desires to copy into the application an object, by-value and ephemerally. This property helps preserve integrity by increasing the difficulty for potentially corrupt data to enter an isolation context of the destination application without the express intention of the user.

These properties each depend at least in part on the communications between the applications being directed, ephemeral, and by-value. A directed communication means that a drag-and-drop or other gesture made by the user identifies one application as the source of the drag and one application as the destination of the drop. When the monitor allows communication on the basis of the drag-and-drop, the monitor facilitates this communication from the identified source application to the identified destination application. Specifically, the drag operation made by the user indicates that the user does not consider this particular instance of extracting data from the source application to be a confidentiality violation. The drop operation by the user, meanwhile, indicates that the user does not consider this particular instance of injecting data into the destination application to be an integrity violation.

In addition, the monitor facilitates this communication in an ephemeral manner. That is, the monitor facilitates a communication that occurs once and at the moment of the gesture. Further, the facilitating of the communication is free from imparting any future permission or capability. Stated otherwise, a source application does not interpret a drag operation as causing the application to transmit a reference to an address of the data in a file store. Likewise, an application should not interpret a drag operation to establish a long-lived permission or pipeline to the other application.

Instead of engaging in a by-reference communication, both the source application and the destination application engage in a by-value communication. For instance, in the example of a drag-and-drop operation, the drag expresses the motion of a constant object. However, the drag does not impart to the receiving application a long-lived reference to an underlying persistent object. Reference semantics would allow the destination application to peek at the object again at a later time (e.g., next week), perhaps seeing sensitive data that was added to the original object in the source application after the drag was expressed. Furthermore, reference semantics would allow the source application to update the object with corrupt contents after the drag, possibly causing the destination application to ingest that corrupt data. As such, the techniques described herein interpret user gestures as expressing a desire to allow a by-value, rather than a by-reference, communication.

Furthermore, the techniques described herein do not obviate other forms of inter-application communication. For instance, the user may still wish to allow specific sets of applications to establish long-lived channels, such as a shared document store. However, these mechanisms may involve UI elements other than or in addition to a drag-and-drop operation. Establishing this consistent behavior may help ensure that the user can express drag-and-drop confidently, knowing that this gesture has well-constrained semantics.

Atomic user gestures, such drag-and-drop, may comprise gestures that a user may employ to express directed, ephemeral, by-value operations both within single applications and across multiple applications that are not strongly isolated. The techniques described in detail below extend this behavior to express trust-sensitive operations (e.g., confidentiality-sensitive or integrity-sensitive operations). By tightly constraining the use of this extension, these techniques increase the likelihood that the desire of a user in expressing a drag ("move this data over here") is generally well correlated with the security requirements of the user ("move nothing more than this data, and no more than this one time"). Furthermore, atomic gestures, such as drag-and-drop, may allow the user to safely express this goal in an intuitive manner.

The discussion begins with a section entitled "Example Computing Architecture," which describes one non-limiting environment that may implement the described techniques. Next, a section entitled "Example Atomic Gesture" illustrates and describes one example type of atomic gesture that may be used to implement the techniques, as well as a flow of example user interfaces (UIs) displayed upon initiation of the gesture through completion of the gesture. A third section, entitled "Example Processes", illustrates several example processes for facilitating secure application interoperation via UI gestures. A brief conclusion ends the discussion.

This brief introduction, including section titles and corresponding summaries, is provided for the reader's convenience and is not intended to limit the scope of the claims, nor the proceeding sections.

Example Computing Architecture

FIG. 1 illustrates an example computer architecture 100 that may implement the described techniques for facilitating secure application interoperation via user interface (UI) gestures in computing devices that strictly isolate applications operating thereon. The architecture 100 includes a user 102 operating a computing device 104. As illustrated, the computing device 104 includes one or more processors 106 and memory 108, which may store an operating system 110 and one or more applications 112(1), 112(2), 112(3), . . . , 112(N) running thereon. In this example, the OS 110 comprises a portion of the trusted computing base of the computing device 104.

While FIG. 1 illustrates the computing device 104 as a personal computer, other implementations may employ a laptop computer, a thin client, a mobile telephone, a portable music player or any other sort of suitable computing device. The memory 108, meanwhile, may include computer-readable storage media in the form of volatile memory, such as Random Access Memory (RAM) and/or non-volatile memory, such as Read Only Memory (ROM) or flash RAM.

The applications 112(1)-(N) may comprise desktop applications, web applications provided by content providers 114(1), . . . , 114(M) over a network 116, and/or any other type of application capable of running on the computing device 104. For instance, applications 112(1) and 112(2) may comprise desktop applications, while applications 112(3) and 112(N) may comprise web applications in the illustrated example. These applications may comprise word processing applications, drawing applications, games, photo libraries, photo editing applications, financial planning applications, or any other type of application. The network 116, meanwhile, is representative of any one or combination of multiple different types of networks, interconnected with each other and functioning as a single large network (e.g., the Internet or an intranet). The network 116 may include wire-based networks (e.g., cable) and wireless networks (e.g., cellular, satellite, etc.).

As illustrated, the computing device 104 implements a security boundary 118 between each of the applications 112(1)-(N). The security boundary 118 functions to strictly isolate communications between each of the applications 112(1)-(N), in contrast to a traditional client computing device, in which each application has nearly unfettered access to data associated with other applications operating on the device.

As illustrated, each application operates and has access to a respective set of data 120(1), 120(2), 120(3), . . . , 120(N). As such, each application has access to its respective data, while not having access to each other set of data unless specifically authorized to do so, again in contrast to applications operating on a traditional desktop operating system. For instance, the application 112(1) may have access to data 120(1), while not having access to data 120(2)-(N). Similarly, the application 112(2) may have access to data 120(2), while not having access to the data 120(1) and 120(3)-120(N).

In some instances, the operating system 110 may pierce the security boundary 118 to allow the applications 112(1)-(N) to communicate with one another. For instance, each application may define one or more user interface (UI) gestures 122(1), 122(2), 122(3), . . . , 122(N) that, when executed by the user 102, cause the OS 110 to pierce the security boundary 118 and allow one application to communicate with another. Additionally or alternatively, the OS 110 may define one or more of the UI gestures 122(1)-122(N). In either instance, when the user 102 engages in a gesture 122(1) expressing a desire to share data 120(1) from the application 112(1) with the application 112(2), the OS 110 may pierce the security boundary 118 and may share the data 120(1) with the application 112(2). In some instances, the OS 110 may pierce the security boundary 118 and share the data 120(1) without prompting the user for explicit permission (e.g., via a pop-up menu or dialog box).

In some instances, the predefined gestures 122(1)-(N) comprise atomic gestures that either wholly succeed or wholly fail. For instance, the predefined gestures 122(1)-(N) may comprise gestures that the user 102 initiates and completes continuously and without interruption. In these instances, the gestures 122(1)-(N) may comprise a drag-and-drop operation (in which the user atomically initiates and completes in a single interaction), rather than a copy-and-paste operation (in which the user could copy data in one action and, any time thereafter, may request to paste the data). In another example, one of the gestures 122(1)-(N) may comprise the user executing, on a command line interface, a particular command that is reserved for allowing communication (e.g., propagating data) across the security boundary 118. Like in the example of the drag-and-drop gesture, by invoking this command, the user is able to clearly and atomically express an intent to allow for a directed, ephemeral, and by-value communication between two otherwise isolated applications.

By utilizing atomic gestures, the user is less susceptible to privacy violations with regards to the source application and integrity violations with regards to the destination application. Furthermore, in some implementations, a same gesture may be used across many different, arbitrary applications (both sources and destinations) and for many different, arbitrary types and formats of data or files.

As illustrated, the OS 110 may include a gesture interpreter 124 to detect initiation of the gestures 122(1)-(N) by the user and, in response, to pierce the security boundary 118 to facilitate directed, ephemeral, by-value communication between the source and the destination applications. While FIG. 1 illustrates that an operating system 110 implementing the gesture interpreter 124, other monitors, such as a web browser, a virtual machine monitor, or the like may additionally or alternatively implement the interpreter 124.

In one instance, the gesture interpreter 124 detects an initiation of a predefined, atomic gesture 122(1) by the user 102. This gesture 122(1) may be effective to indicate an intent of the user 102 to move data 120(1) from the application 112(1) to the application 112(2). For instance, the user 102 may drag the data 120(1) from a user interface rendering the application 112(1) and may drop the data 120(1) onto a user interface rendering the application 112(2).

In response to detecting this gesture 122(1), the gesture interpreter 124 may request the selected data 120(1) from the application 112(1). For instance, the interpreter 124 may request the value of the data, rather than a reference to the data such as an address to the data in the file system. By requesting the underlying value of the data, the gesture interpreter 124 is in effect requesting a constant object that does not change as future changes are made to the data 120(1) via the first application 112(1). For instance, if the data 120(1) comprises a photo, then the value requested by the interpreter 124 may comprise a bitmap of the image that does not alter after the user 102 modifies the underlying image via the first application 112(1).

After receiving the data by-value and after detecting that the user 102 has completed the atomic gesture (e.g., by dropping the data 120(1) into the application 112(2)), the OS 110 may provide the value of the data to the application 112(2). The application 112(2) may (or may not) convert the data into another format (e.g., a format that is easier to parse safely) and then interprets the data in a way that maintains the integrity of the second application 112(2). For instance, if the data 120(1) comprises a bitmap and the second application 112(2) comprises a photo editor, the second application 112(2) may simply render the bitmap, rather than execute any macros, script, or other code that could potentially have made its way into the data.

After providing the data 120(1) to the application 112(2), the OS 110 does not grant the application 112(2) permission to access the data 120(1) from the application 112(1) at a later time. As such, the transaction is ephemeral. Furthermore, when the OS 110 temporarily pierces the security boundary 118, the OS 110 does not allow the application 112(1) access to the data 120(2) accessible by and associated with the application 112(2). As such, the transaction remains directed. With use of the gesture 120(1), the user 102(1) is thus able to intuitively pierce the security boundary 118 in a directed, ephemeral, and by-value manner.

Example Atomic Gesture

Figure 2:
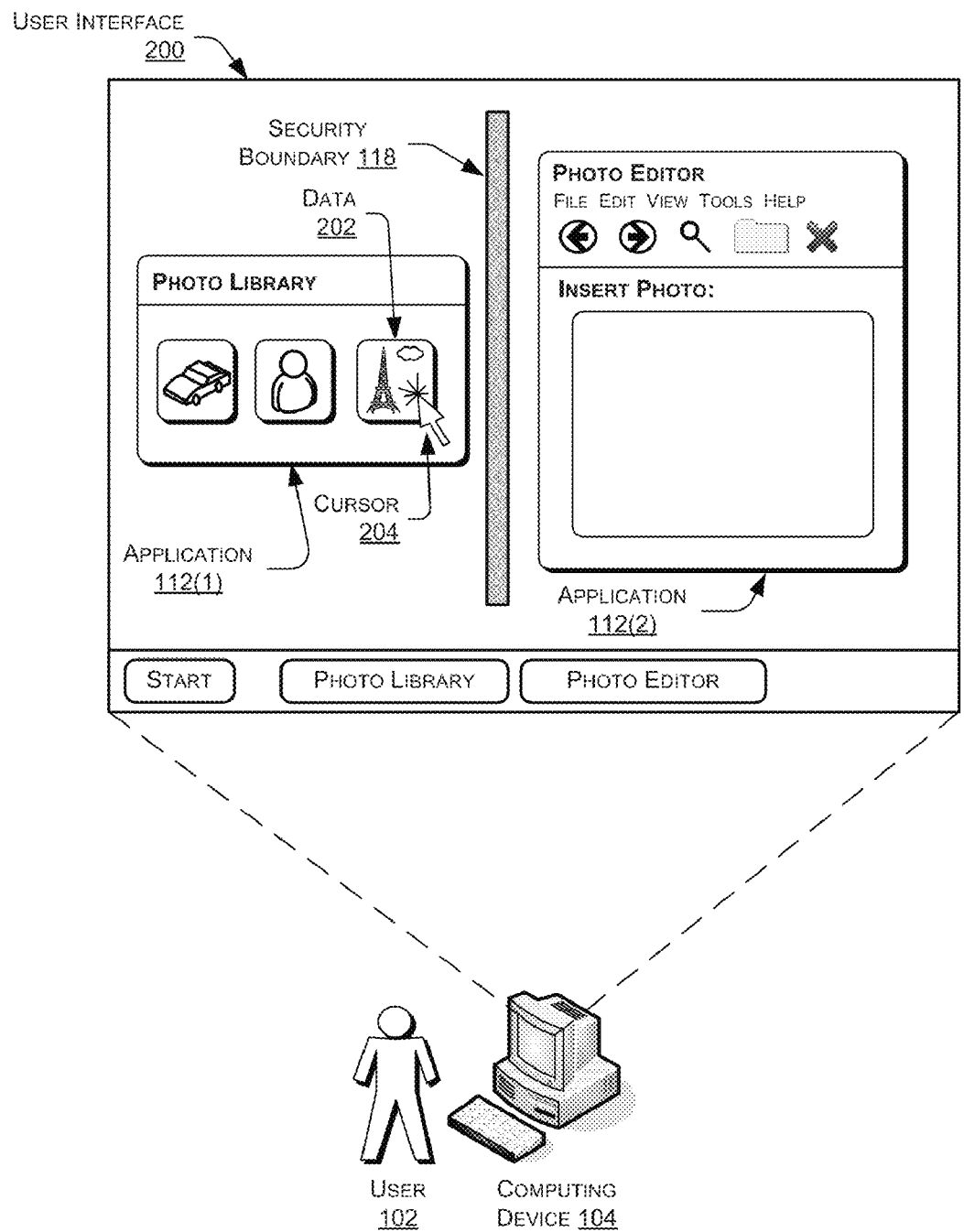
FIGS. 2-4 illustrate an example user interface (UI) and an example UI gesture by which the user may pierce a security boundary between two applications in a directed, ephemeral, and by-value manner. Here, the gesture comprises the user dragging data from a first application and dropping the data into a second application.
Figure 3:
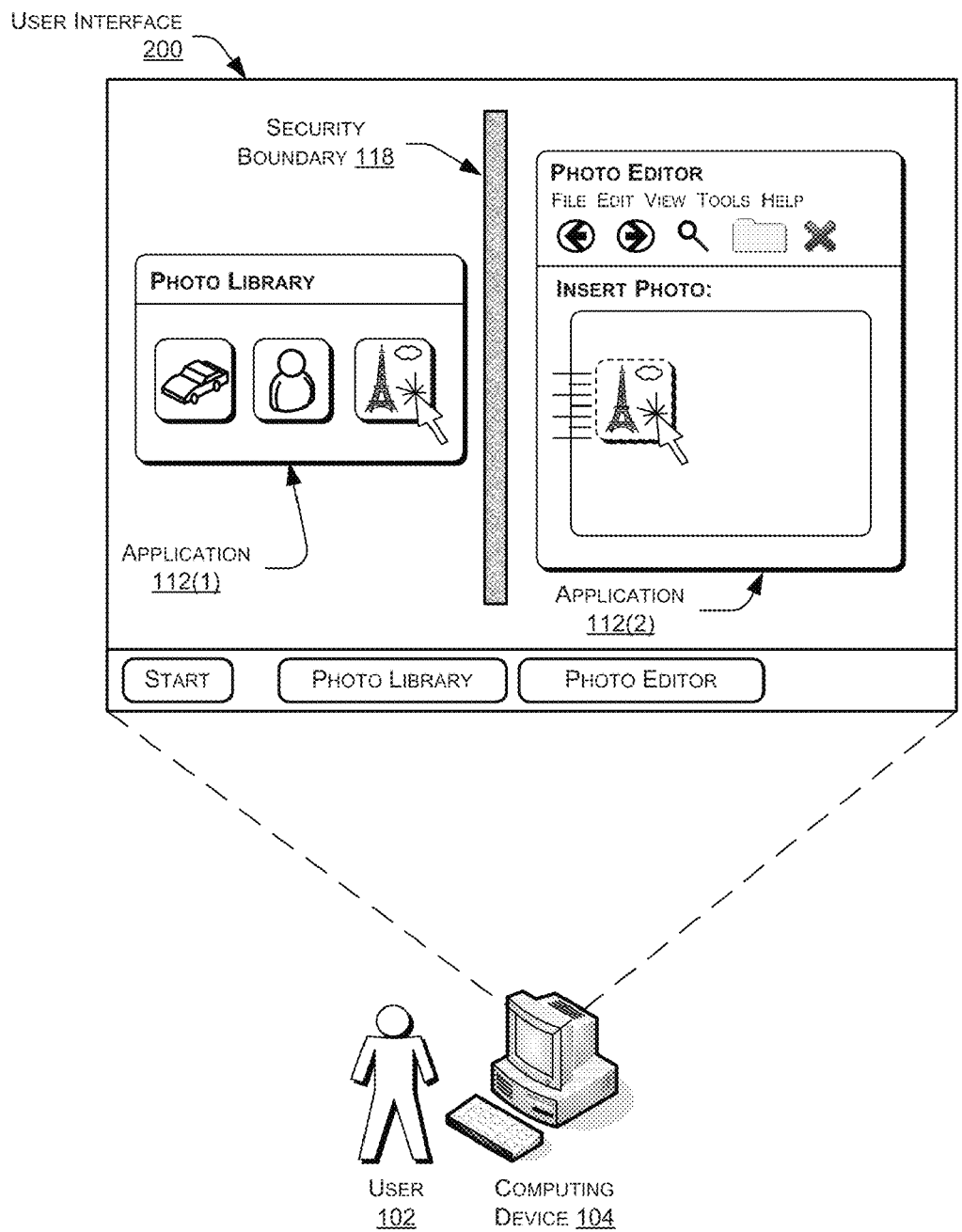
Figure 4:
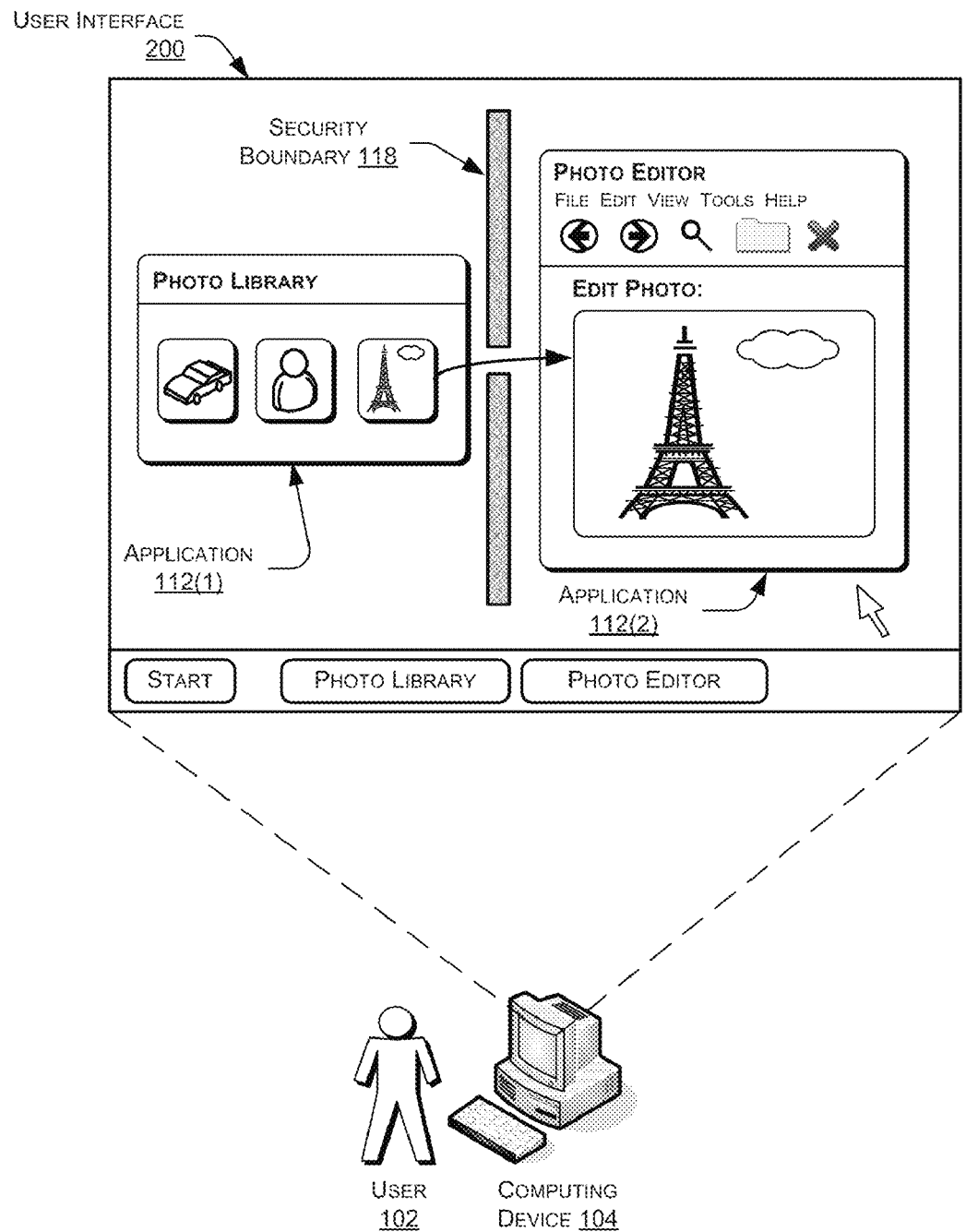

FIGS. 2-4 illustrate an example user interface (UI) 200 and an example UI gesture by which the user 102 may pierce the security boundary 118 between two applications in a directed, ephemeral, and by-value manner. While the gesture may comprise any atomic gesture, in this example the gesture comprises the user dragging data 202 via a cursor 204 from a first application 112(1) and dropping the data 202 into a second application 112(2). Here, the first application 112(1) comprises a photo library, the second application 112(2) comprises a photo editor, and the data 202 comprises a thumbnail of a picture. While FIGS. 2-4 provide one example gesture, piece of data, and set of applications, other implementations may employ other gestures, data types, and/or application types. Further, while these figures illustrate the security boundary 118, this illustration is merely representative of a non-visual, virtual security boundary that isolates the first application 112(1) from the second application 112(2).

FIG. 2 illustrates the UI 200 at a time when the user 102 selects the data 202 via a cursor 204. As illustrated, the user 102 has here selected the thumbnail of the Eiffel Tower, but not the thumbnail of either the car or the person. As such, the application 112(1) will at most share the photograph of the Eiffel Tower (and not the other two photographs represented by thumbnails, which the user 102 has not selected).

FIG. 3, meanwhile, illustrates the UI 200 as the user 102 begins to drag the data from a window associated with the first application 112(1) towards a window associated with the second application 112(2). At this point, the OS 110 may detect the drag gesture and, in response, may request the selected data by-value from the first application 112(1). As discussed above, the application 112(1) may in turn provide this data. Here, for instance, the application 112(1) may provide a bitmap of the selected image. However, the application 112(1) may refrain from providing the data by-reference (i.e., an address to the data 202 in the file system), and may also refrain from providing other data associated with this application 112(1) to the OS 110. In some instances, meanwhile, the application 112(1) may provide this additional information (e.g., an address to the data) to the OS 110, which refrains from providing this additional information to the destination application 112(2).

Finally, FIG. 4 represents the UI 200 at a time when the user 102 drops the selected data 202 into a window associated with the second application 112(2). At the this point, the OS 110 may determine that the user 102 has engaged in an atomic gesture and, in response, may pierce the security boundary 118 for the limited purpose of ephemerally providing the selected data 202 by-value to the second application 112(2). Upon receiving the data 202, the second application 112(2) may interpret the value of the data 202 while maintaining its own integrity. Here, for instance, the photo editor application 112(2) may render the bitmap and take no further action (e.g., may refrain from running macros, script, etc. that could be attached to the data). Each of the operations 518-524 may occur without prompting the user 102 for permission to pierce the security boundary 118 and share the selected data.

As such, the gesture depicted in FIGS. 2-4 enables the user 102 to intuitively pierce an otherwise strict security boundary between two applications while maintaining the privacy of the data within the first application 112(1) and the integrity of the second application 112(2). That is, the user 102 may drag a picture from one application to another, with the results (i.e., the rendering of the image) being no more than the user likely expected.

Example Processes

Figure 5:
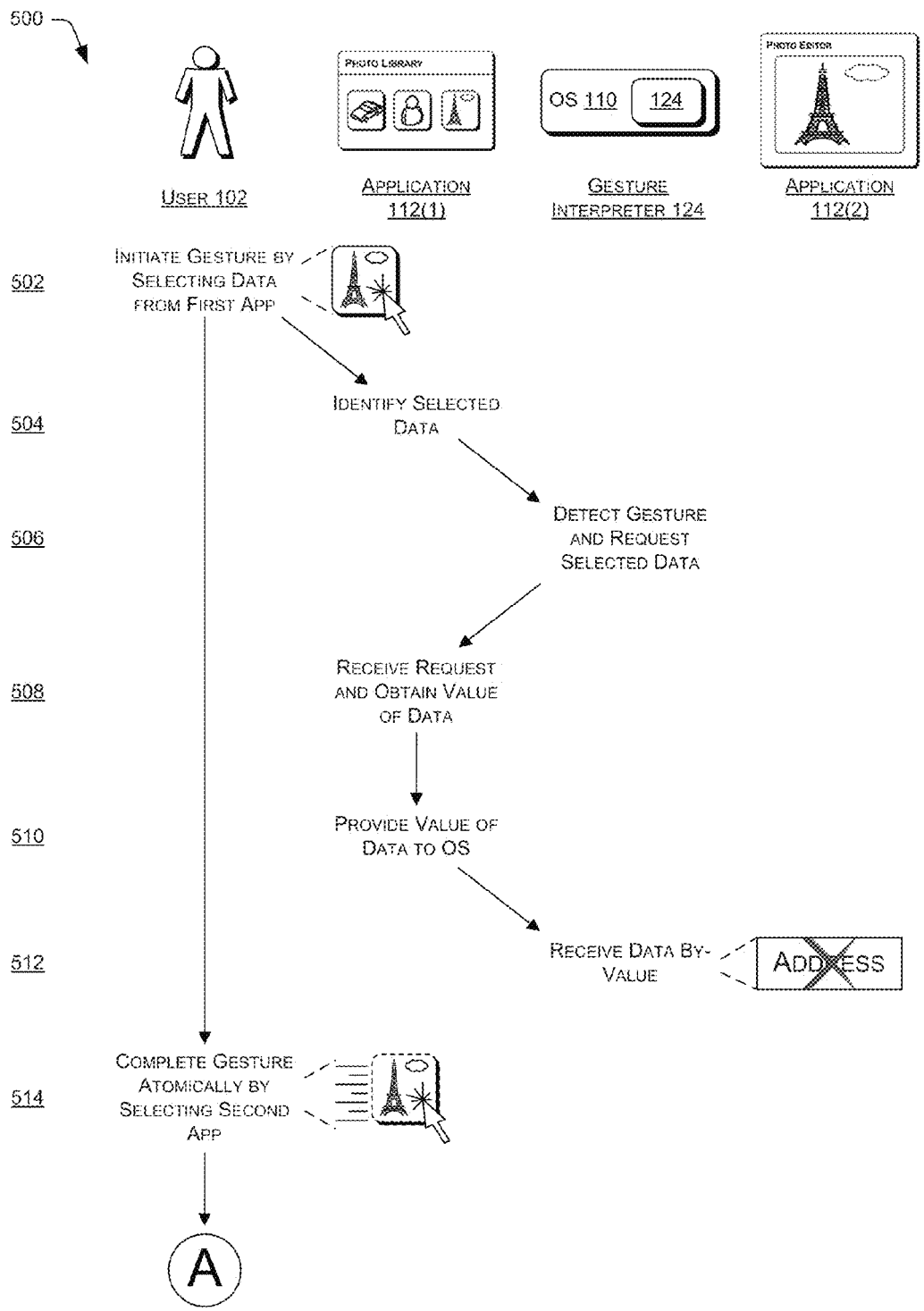
FIGS. 5-6 together comprise a flow diagram illustrating an example process for piercing the security boundary represented in FIGS. 2-4. This process involves a monitor (e.g., an operating system) detecting an atomic gesture, retrieving a value of selected data from the first application, and providing the value of the data to a second application upon completion of the atomic gesture. The monitor refrains from granting future access to the data to the second application, and refrains from providing and granting access to an address to the data on a file system. Further, the monitor does not allow the first application access to data from the second application during the piercing of the boundary.
Figure 6:
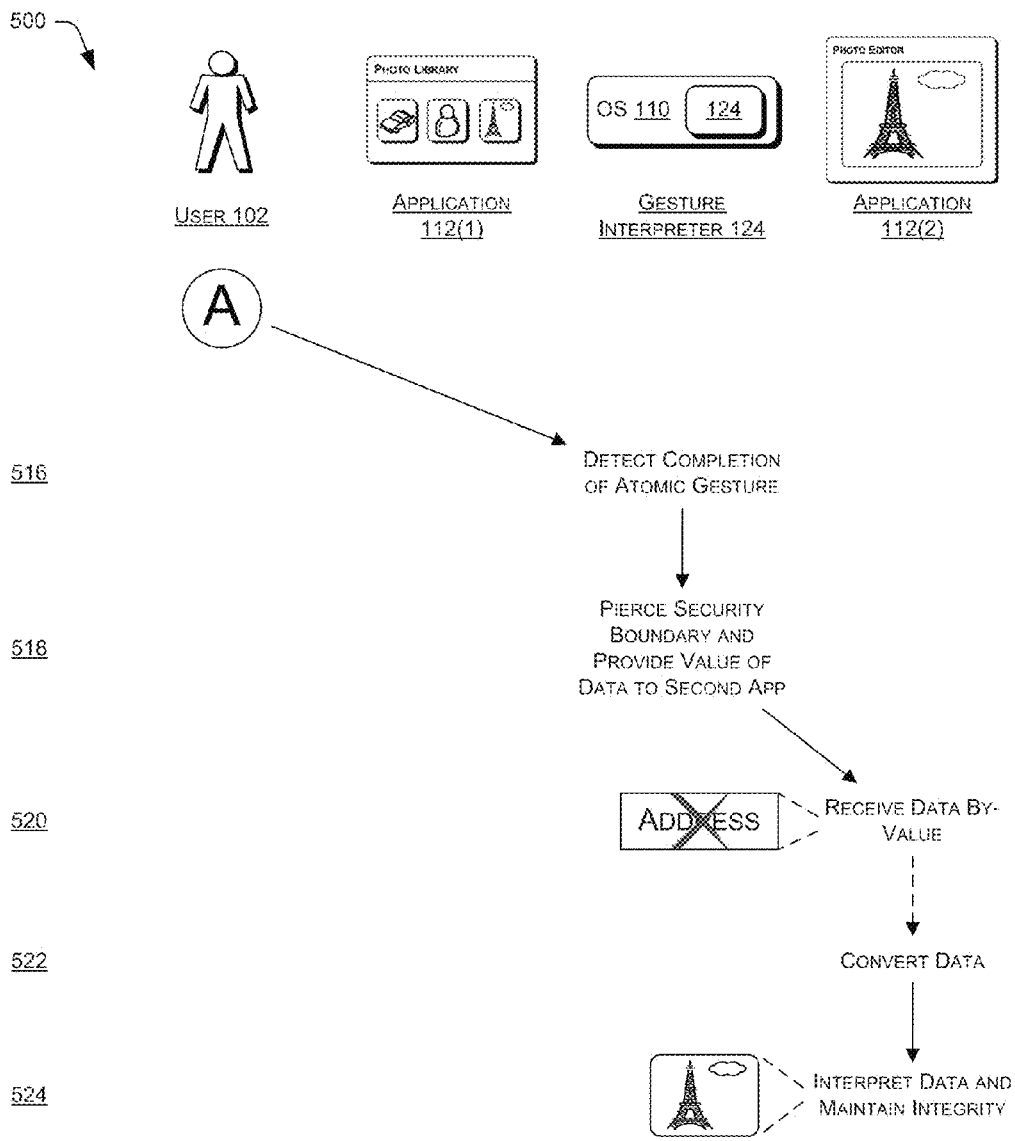

FIGS. 5-6 comprise a flow diagram illustrating an example process 500 for piercing the security boundary 118 represented in FIGS. 2-4. The process 500 (as well as each process described herein) is illustrated as a collection of acts in a logical flow graph, which represents a sequence of operations that can be implemented in hardware, software, or a combination thereof. In the context of software, the blocks represent computer instructions stored on one or more computer-readable media that, when executed by one or more processors, perform the recited operations. Note that the order in which the process is described is not intended to be construed as a limitation, and any number of the described acts can be combined in any order to implement the process, or an alternate process. Additionally, individual blocks may be deleted from the process without departing from the spirit and scope of the subject matter described herein.

The process 500 includes, at 502, the user 102 initiating a gesture by selecting a piece of data from a first application. For instance, the user may begin to drag an object rendered within a window of the first application. Because in this example the gesture comprises an atomic gesture, the user 102 continues this gesture without interruption through the operations 502-514. At 504, meanwhile, the first application identifies the selected data. For instance, the application may identify that the user has selected a particular one of multiple thumbnail images that the first application currently renders. At 506, the gesture interpreter 124 (in this example, stored on the operating system 110) may detect the gesture, which the first and/or second application may predefine. In response, the gesture interpreter 124 may also request the selected data at 506. While FIG. 5 illustrates that that the interpreter 124 may request the data in response to detecting the initiation of the gesture, in other implementations the interpreter may wait to request the data until completion of the gesture.

At 508, the first application receives the request and obtains the value of the data. At 510, the first application provides the value of the data to the gesture interpreter 124. In some instances, the application provides the value but does not provide the address to the data in the file system. However, in other implementations, the application may provide the address to the data to the gesture interpreter 124 stored on the OS 110 (or other monitor), which in turn obtains the value of the data from the file system. In these instance, the OS 110 (or other monitor) later provides the value of the data to the second application while refraining from passing the address of the data or a capability to access the data at the address to the second application (as described below).

At 512, the gesture interpreter 124 receives the selected data by-value in this example. At 514, the user completes the atomic gesture by selecting the second application. For instance, the user 102 may complete the gesture by dropping the selected piece of data into a window associated with the second application.

FIG. 6 continues the illustration of the process 500. At 516, the gesture interpreter 124 detects the completion of the atomic gesture. In response, the OS 110 (or other monitor) pierces the security boundary 118 that otherwise isolates the first and second applications from one another at 518. The OS 110 also provides the selected data by-value to the second application. However, the OS 110 does not provide the data by-reference and, hence, does not provide an address to the selected data on the file system, nor does the OS 110 provide to the second application a permission to access the data at a later time. Furthermore, the OS 110 does not pierce the boundary in a way that grants the first application access to any data associated with the second application.

At 520, the second application receives the data by-value and, again, does not receive the data by-reference. At 522, the second application may (or may not) convert the data to a format that may be easier for the second application to parse. At 524, the second application interprets the received data while maintaining its own integrity. To decrease the chances of an integrity violation, the second application refrains from doing more than the intention expressed via the gesture of the user 102. For instance, if the user 102 dragged and dropped a thumbnail image, the second application may render the image but might not run a macro, as this type of action is not abundantly clear to be the intent of the user executing the drag-and-drop gesture.

Figure 7:
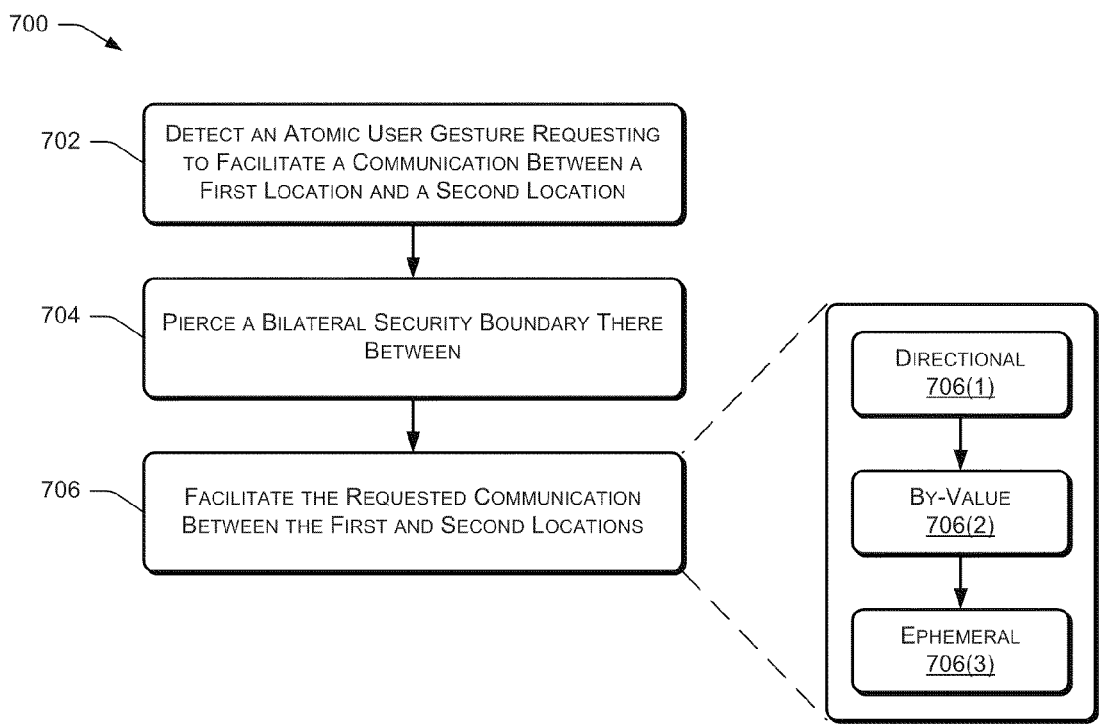
FIGS. 7-8 are flow diagrams of example processes for facilitating secure application interoperation via UI gestures with use of the techniques described herein.
Figure 8:
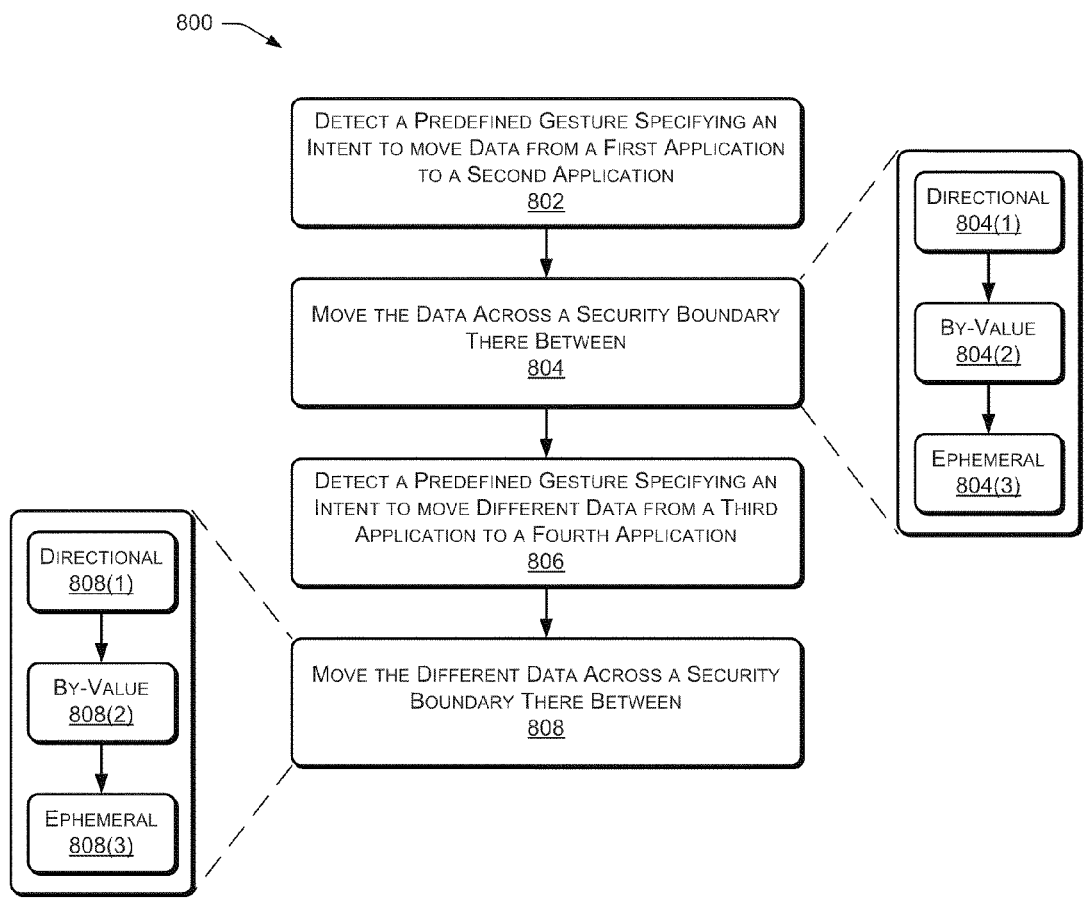

FIGS. 7-8 are flow diagrams of example processes 700 and 800 for facilitating secure application interoperation via UI gestures with use of the techniques described herein. The process 700 includes, at 702, detecting an atomic user gesture requesting to facilitate a communication between a first location of a computing device and a second location of the computing device. For instance, the first and second locations may comprise respective applications operating atop a monitor of the computing device. Further, in some instances, the computing device provides a bilateral security boundary isolating communications from the first location to the second location and from the second location to the first location.

At 704 and in response to detecting the atomic user gesture, the process 700 pierces the bilateral security boundary and, at 706, the process 700 facilitates the requested communication between the first location and the second location. As illustrated, this facilitating may be directional 706(1), by-value 706(2), and ephemeral 706(3), as discussed in detail below.

In some instances, the atomic user gesture comprises a gesture that is uninterrupted and continuous from selection of the first location through selection of the second location. For example, the atomic user gesture may comprise a drag-and-drop gesture as described and illustrated above with reference to FIGS. 2-4.

Further, the atomic user gesture may specify the first location as a source of the requested communication and the second location as a destination of the requested communication. In these instances, the facilitating of the requested communication comprises facilitating communication from the source to the destination while refraining from facilitating communication from the destination to the source. In that way, the process 700 enables a directional piercing of the security boundary, thus maintaining confidentiality of the destination application and integrity of the source application.

In one example, the requested communication comprises a request to move data from the first location to the second location. Here, the facilitating of the requested communication comprises moving the data from the first location to the second location, possibly by-value rather than by-reference. In these instances, the process 700 may copy out a value of the data from the first location while refraining from copying out an address of the data. Further, the process 700 may copy the value of the data into the second location while refraining from copying in the address of the data.

Finally, in some instances the facilitating of the communication may be ephemeral. Here, the process 700 refrains from imparting a permission to the second location to access the data from the first location at a later time. Stated otherwise, the destination receives the data at completion of the gesture with no capability to access the data at a later time.

FIG. 8 illustrates the process 800 and includes, at 802, detecting a predefined gesture that specifies an intent of a user to move data from a first application to a second application and across a security boundary there between. As discussed above, this gesture may comprise a continuous and uninterrupted gesture, such as a drag-and-drop operation. At 804, the process 800 moves the data from the first application to the second application across the security boundary there between at least partly in response to the detecting of the gesture and without prompting the user for permission. As illustrated, the moving of the data may be directional 804(1), by-value 804(2), and ephemeral 804(3).

At 806, the process 800 again detects the predefined gesture, such as the drag-and-drop gesture. Here, however, the again detected gesture specifies an intent of the user to move different data from and to different applications, namely from a third application to a fourth application and across a security boundary there between. At 808, the process 800 moves the different data from the third application to the fourth application across the security boundary there between at least partly in response to the again detecting of the gesture and without prompting the user for permission. As with the moving of the data, the moving of the different data may be directional 808(1), by-value 808(2), and ephemeral 808(3).

As this process 800 illustrates, the techniques described herein may allow for application developers to utilize a same or different gestures to facilitate communication across security boundaries for numerous different and arbitrary applications. Further, this gesture(s) may be used to move numerous types of different and arbitrary data. For instance, a user may move data from files having varying formats to numerous, different applications. In one specific example, a user may be able to move arbitrary data types from multiple, different arbitrary sources to multiple different arbitrary locations with a single, common gesture, such as a drag-and-drop gesture.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable media storing computer-executable instructions that, when executed by one or more processors, cause the one or more processors to perform acts comprising:
    detecting an atomic user gesture requesting to facilitate a communication between a first location of a computing device and a second location of the computing device, the computing device providing a bilateral security boundary isolating communications from the first location to the second location and from the second location to the first location; and
    at least partly in response to the detecting of the atomic user gesture:
        piercing the bilateral security boundary isolating the communications from the first location to the second location and from the second location to the first location, wherein piercing the bilateral security boundary is ephemeral, such that the requested communication does not impart a persistent permission to the second location to access the data from the first location after the requested communication has finished; and
        facilitating the requested communication between the first location and the second location.

2. One or more computer-readable media as recited in claim 1, wherein the atomic user gesture comprises a gesture that is uninterrupted and continuous from selection of the first location through selection of the second location.

3. One or more computer-readable media as recited in claim 2, wherein the atomic user gesture comprises a drag-and-drop gesture.

4. One or more computer-readable media as recited in claim 1, wherein:
the atomic user gesture specifies the first location as a source of the requested communication and the second location as a destination of the requested communication; and
the facilitating of the requested communication comprises facilitating communication from the source to the destination while refraining from facilitating communication from the destination to the source.

5. One or more computer-readable media as recited in claim 1, wherein:
the requested communication comprises a request to move data from the first location to the second location; and
the facilitating of the requested communication comprises:
copying out a value of the data from the first location; and
copying the value of the data into the second location and refraining from copying in an address of the data to the second location.

6. A system comprising:
one or more processors;
memory, accessible by the one or more processors;
multiple applications, stored in the memory and executable by the one or more processors; and
an operating system, stored in the memory and executable by the one or more processors to:
run the multiple applications on a single computing device and enforce security boundaries isolating each of the multiple applications from the other;
detect a gesture made by a user, the gesture requesting to enable communication between a first of the multiple applications and a second of the multiple applications and across a security boundary there between; and
enable the communication between the first and the second application and across the security boundary there between at least partly in response to the detecting of the gesture and without prompting the user for permission.

7. A system as recited in claim 6, wherein:
the request to enable the communication comprises a request to move data from the first application to the second application; and
the gesture comprises a gesture that is uninterrupted and continuous from selection of the first application as a source of the data and selection of the second application as a destination of the data.

8. A system as recited in claim 6, wherein the gesture comprises a drag-and-drop gesture dragging data from a window associated with the first application and dropping the data into a window associated with the second application.

9. A system as recited in claim 6, wherein:
the gesture specifies a direction of the communication between the first and the second application; and
the operating system is executable by the one or more processors to enable the communication between the first and the second application in the specified direction while refraining from enabling communication in an opposite direction.

10. A system as recited in claim 6, wherein:
the request to enable the communication comprises a request to move data from the first application to the second application; and
the operating system is executable by the one or more processors to enable the communication by:
copying out a value of the data from the first application; and
copying the value of the data into the second application while refraining from copying in an address of the data.

11. A system as recited in claim 6, wherein the operating system is further executable by the one or more processors to:
refrain from imparting a future permission to the first and the second applications to communicate with one another across the security boundary there between at a later time.

12. A system as recited in claim 6, wherein the security boundary between the first and the second application comprises a bilateral security boundary that prevents communications from the first application to the second application and communications from the second application to the first application.

13. The system as recited in claim 6, wherein:
the request to enable the communication comprises a request to move data from the first application to the second application; and
the operating system is executable by the one or more processors to enable the communication by:
copying out an address of the data from the first application;
storing the address of the data from the first application in the memory associated with the operating system;
obtaining a value of the data from the first application based on the stored address of the data; and
copying the value of the data into the second application while refraining from copying in the address of the data to the second application.

14. A method implemented at least in part by a computing device, the method comprising:
detecting a single occurrence of a predefined gesture that specifies an intent of a user to move data from a first application to a second application and across a security boundary there between;
moving the data from the first application to the second application and across the security boundary there between at least partly in response to the detecting of the gesture and without prompting the user for permission;
detecting a separate occurrence of the predefined gesture, the separate occurrence of the detected gesture specifying an intent of the user to move different data from a third application to a fourth application and across a different security boundary there between; and
moving the different data from the third application to the fourth application and across the different security boundary there between at least partly in response to the detecting of the separate occurrence of the gesture and without prompting the user for permission.

15. A method as recited in claim 14, wherein the predefined gesture comprises a gesture that is uninterrupted and continuous from selection of a source of data to be moved through selection of a destination of the data to be moved.

16. A method as recited in claim 14, wherein:
the moving of the data from the first application to the second application comprises obtaining a constant object representing the data from the first application and providing the constant object representing the data to the second application; and
the moving of the different data from the third application to the fourth application comprises obtaining a constant object representing the different data from the third application and providing the constant object representing the different data to the fourth application.

17. A method as recited in claim 14, wherein the data is stored at a particular address on a file system and the different data is stored at a different particular address on the file system, and wherein:
the moving of the data from the first application to the second application comprises refraining from providing the particular address of the data on the file system to the second application; and
the moving of the different data from the third application to the fourth application comprises refraining from providing the different particular address of the different data on the file system to the fourth application.

18. A method as recited in claim 14, wherein:
the moving of the data from the first application to the second application is free from granting the second application future access to the data from the first application; and
the moving of the different data from the third application to the fourth application is free from granting the fourth application future access to the data from the third application.

19. A method as recited in claim 14, wherein the data from the first application is from a file associated with a particular format, and the different data from the third application is from a different file associated with a different particular format.

20. The one or more computer-readable media as recited in claim 1, further comprising:
detecting another occurrence of the atomic user gesture requesting to facilitate a communication between the first location of the computing device and the second location of the computing device; and
at least partly in response to the detecting of the another occurrence of the atomic user gesture:
piercing the bilateral security boundary isolating the communications from the first location to the second location and from the second location to the first location, wherein piercing the bilateral security boundary is ephemeral, such that the requested communication is free from imparting a persistent permission to the second location to access the data from the first location at a later time; and
facilitating the requested communication between the first location and the second location.

* * * * *